June 24, 1930. R. CHILTON 1,768,116
ENGINE STARTER
Filed April 24, 1929
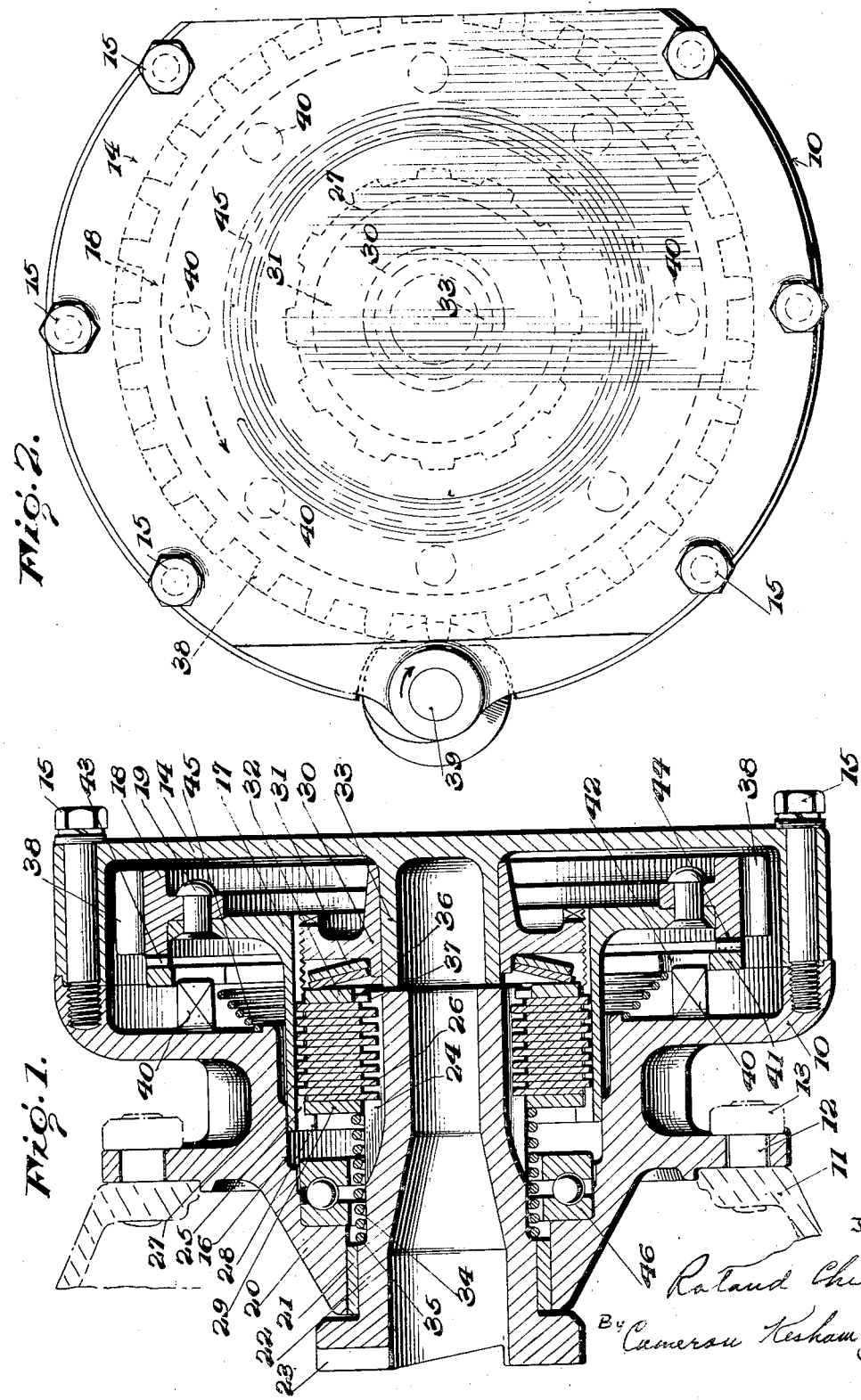

Patented June 24, 1930

1,768,116

UNITED STATES PATENT OFFICE

ROLAND CHILTON, OF KEYPORT, NEW JERSEY, ASSIGNOR TO ECLIPSE MACHINE COMPANY, OF ELMIRA HEIGHTS, NEW YORK, A CORPORATION OF NEW YORK

ENGINE STARTER

Application filed April 24, 1929. Serial No. 357,833.

This invention relates to engine starters, and particularly to manually operable cranking means adapted for use in starting engines.

One of the objects of the present invention is to provide novel starting mechanism of the above character which is small and light, but strong, and in which the parts are rigidly supported.

Another object of the invention is the provision of a novel starter in which the engine engaging member is moved to driving position by the initial rotation thereof, irrespective of the speed of said rotation.

A further object is to provide novel starting mechanism in which strains due to backfiring of the engine are limited in amount, and are transmitted symmetrically to the engine casing thereby avoiding transverse or weaving stresses.

Other objects and advantages will be apparent to those skilled in this art from the following description taken in connection with the acompanying drawing, in which Fig. 1 is a longitudinal mid-sectional view of the device, and Fig. 2 is an end elevation thereof.

The mechanism constituting the subject matter of the present invention comprises a casing member 10, preferably composed of a suitable light alloy, adapted to be mounted on the casing 11 of an engine to be started by means such as the studs 12 and nuts 13. A complementary casing member 14 is adapted to fit tightly against the open side of casing member 10, being suitably fixed thereto as by cap screws 15, and forming therewith an oil tight casing.

Casing member 10 is provided with an internal cylindrical bearing surface 16, and a driving barrel member 17 is slidably mounted therein and extends outwardly within the casing member 14 where it is provided with a driving gear 18 formed integral therewith or suitably attached thereto as by rivets 19.

Casing member 10 is provided with a boss 20, extending within the engine casing and provided with a suitable bearing 21 for a shiftable clutch member 22 slidably and rotatably mounted therein, and provided with clutch jaws 23 adapted to engage and drive a member (not shown) of the engine to be started. Clutch member 22 extends in telescoping relation to the barrel member 17, and said telescoping members are splined at 24 and 25 respectively for the reception of a plurality of friction disk members 26 and 27 which are adapted to form a yielding driving connection from the barrel to said clutch member. The barrel 17 is provided at its inner end with an internal shoulder 28, against which a stop ring 29 is adapted to seat. The outer end of the barrel is threaded for the reception of an adjusting member 30 which is adapted to place a variable pressure upon the friction disks by means of the dished shaped spring members 31, and pressure ring 32. The adjusting member 30 is slidably mounted on an inwardly extending bearing portion 33 of casing member 14, so that the barrel member 17 is in effect provided with aligned bearings at the ends thereof.

A spring 34 is mounted on the clutch member 22, and bears at one end against a shoulder 35 of said clutch member and at the other end against ring 29 so as to yieldingly urge the clutch member to the left in Fig. 1. A split ring 36 is mounted in a groove 37 in the end of clutch member 22 and is adapted to bear against the end disk member 27 to form a stop to limit the action of spring 34 on the clutch member.

Referring to Fig. 2 of the drawing, it will be seen that gear 18 is provided with spiral teeth 38 and a driving shaft 39 is suitably mounted on the casing members 10 and 14 and is provided with a pinion having spiral teeth meshing with the teeth 38, the inclination of such teeth being so arranged that rotation of the driving shaft in the direction of the arrow will cause longitudinal displacement of the gear 18 and spiral member 17 to the left in Fig. 1.

Casing member 10 is provided with a plurality of studs 40, and a ratchet ring member 41 provided with suitable registering openings 42 therein is adapted to be mounted slidably and non-rotatably on said studs.

Ratchet ring 41 is provided with a series of ratchet teeth 43 which are adapted to engage a series of complementary teeth 44 on the side of gear member 18, the inclination of said teeth being so arranged as to allow rotation of the gear member 18 in the direction of the arrow in Fig. 2, but to prevent reverse rotation thereof. A coil spring 45 is provided between the ratchet ring 41 and the adjacent side of casing 10 in order to urge the ratchet ring to the right in Fig. 1 and thus yieldingly hold the teeth 43 and 44 in engagement with each other.

Longitudinal motion of the barrel assembly to the left in Fig. 1 under the action of forward rotation of the driving gearing is limited by suitable means such as an antifriction thrust bearing 46 mounted within the boss 20 of casing member 10.

In operation, when the driving shaft 39 is initially rotated, the gear 18 is restrained from rotation by the friction of the parts and by the frictional engagement of the ratchet ring 41 therewith, so that the ring 18 and the barrel assembly are moved bodily to the left in Fig. 1 by reason of the inclination of the teeth on the driving gear 18 and its actuating pinion. This longitudinal motion causes the spring 34 to yieldingly urge the clutch member 22 into engagement with the engine member to be driven thereby. When this longitudinal motion of the barrel assembly is arrested by the thrust bearing 46, further rotation of the driving shaft 39 causes rotation of gear 18 which is transmitted through the barrel and friction disks to the clutch member 22 to start the engine. During this time the gear 18 is overrunning the teeth on the ratchet ring 41. When the engine picks up and runs under its own power, the clutch member 22 is brought back to its normal position by reason of the inclination of the clutch teeth 23, and the barrel and gear assembly are also moved back to normal position by the joint action of the springs 34 and 45.

Should the engine backfire during the cranking operation, the clutch member 22 will rotate backwards with the engine member, but the gear 18 and barrel 17 are prevented from reverse rotation by the ratchet ring 41 engaging with said gear so that the friction disks 26 and 27 are forced to slip on each other, relieving the strain on the parts, and quickly bringing the engine member to rest. It will be understood that the adjusting member 30 is threaded into the barrel member 17 until the friction disks will transmit sufficient torque to crank the engine under normal conditions, but will slip under excessive loads and thus protect the mechanism.

Although but one embodiment of the invention has been shown and described in detail, it is to be expressly understood that the illustrated embodiment is not exclusive and various other embodiments will now suggest themselves to those skilled in the art, while changes may be made in the construction, arrangement and proportions of parts, and certain features used without other features, without departing from the spirit of the invention. Reference is therefore to be had to the claims hereto appended for a definition of the limits of the invention.

What is claimed is:

1. In an engine starter, a casing, a barrel member slidably and rotatably mounted therein, a member slidably mounted within said barrel member and adapted to engage and drive a member of an engine to be started, a yielding driving connection between the barrel member and engine engaging member, driving means for said barrel member and adapted to impart rotary and longitudinal movement thereto, means for transmitting longitudinal movement of the barrel member to the engine engaging member to move it into operative position, and means slidably but non-rotatably mounted in said casing for preventing reverse rotation of said barrel member.

2. In an engine starter, a casing, a barrel member slidably and rotatably mounted therein, a clutch member slidably mounted within said barrel member and adapted to engage and drive an engine to be started, a yielding driving connection between the barrel member and clutch member, driving means for said barrel member adapted to impart rotary and longitudinal movement thereto, means for yieldingly transmitting longitudinal movement of the barrel member to the engine engaging member to move it into operative position, and means slidably but non-rotatively mounted in said casing for preventing reverse rotation of said barrel member and causing longitudinal movement of the barrel member by impeding its forward rotation.

3. In an engine starter, a casing, a barrel member slidably and rotatably mounted therein, a clutch member slidably mounted within said barrel member and adapted to engage and drive a member of an engine to be started, a yielding driving connection between the barrel member and clutch member, spiral gearing for driving said barrel member arranged to urge said member toward the engine during the forward operation thereof, driving means for transmitting longitudinal movement of the barrel member to the clutch member to move it into operative position, and means slidably but non-rotatively mounted in said casing for preventing reverse rotation of said barrel member.

4. In an engine starter, a casing, a barrel member slidably and rotatably mounted therein, a clutch member slidably mounted within said barrel member and adapted to engage and drive a member of an engine to be started, a friction clutch connection between the barrel member and clutch member, spiral gearing for driving said barrel member arranged to urge said member towards the engine during the driving operation, means for yieldingly transmitting longitudinal movement of the barrel member to the clutch member to move it to operative position, and a ratchet member slidably but non-rotatively mounted in said casing, cooperating with the periphery of the barrel to prevent reverse rotation thereof.

5. In an engine starter, a casing, a barrel member slidably and rotatably mounted therein, a clutch member slidably mounted within said barrel member and adapted to engage and drive a member of an engine to be started, a yielding driving connection between the barrel member and clutch member, means for driving said barrel member, including a gear mounted thereon having teeth so inclined that forward rotation thereof tends to move the barrel longitudinally toward the engine, means for yieldingly transmitting such movement to the clutch member, and means slidably but non-rotatively mounted in said casing for preventing reverse rotation of said gear and impeding its forward rotation to insure its initial longitudinal movement.

6. In an engine starter, a casing, a barrel member slidably and rotatably mounted therein, a clutch member slidably mounted in said barrel member and adapted to engage and drive a member of an engine to be started, a yielding driving connection between the barrel member and clutch member, means for driving said barrel member including a gear mounted thereon having teeth so inclined that forward rotation thereof tends to move the barrel longitudinally toward the engine, means for yieldingly transmitting such longitudinal movement to said clutch member, said gear having lateral ratchet teeth, said casing having longitudinally extending keying means, a ratchet member slidably mounted on said keying means and adapted to prevent reverse rotation of said gear, and a spring cooperating with said ratchet member to urge it into engagement with the gear and thereby bias the gear and barrel member toward normal inoperative position.

In testimony whereof I have signed this specification.

ROLAND CHILTON.